Oct. 7, 1941.   W. B. MacKENZIE   2,258,255
ELECTRICAL INSULATION
Filed Aug. 17, 1937
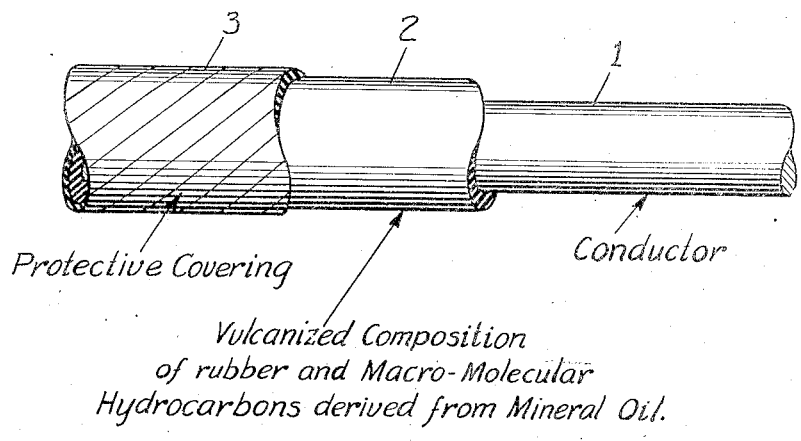
Protective Covering
Conductor
Vulcanized Composition
of rubber and Macro-Molecular
Hydrocarbons derived from Mineral Oil.
INVENTOR
Wallace Bentley MacKenzie
BY
ATTORNEY

UNITED STATES PATENT OFFICE 2,258,255

ELECTRICAL INSULATION

Wallace Bentley MacKenzie, New York, N. Y., assignor to Phelps Dodge Copper Products Corporation, New York, N. Y., a corporation of Delaware Application August 17, 1937, Serial No. 159,591

2 Claims. (Cl. 260—4)

My invention relates to an electric cable intended for use where there is danger of exposure to high temperatures and/or to water, and more particularly to an insulating compound for electric wires and cables of the general type known as rubber insulated.

I have discovered that when a substantial amount of saturated macro-molecular hydrocarbon derived from mineral oil is included in the rubber, there is found a rubber-like insulating compound having properties of unprecedented heat-resistance and of unusually high resistance to water absorption as determined by deterioration of electrical properties when immersed in hot water. Such an insulation may be extruded or otherwise applied to the wire, like any ordinary rubber compound and may be cured by vulcanizing in the same way.

The electrical properties and other characteristics of my cable may be varied by using either with or as a substitute for the rubber, "Neoprene", "Thiokol" "AXF" plastic or any plastic susceptible of conversion to an elastic form by the use of a conversion agent such as sulfur or zinc oxide; antioxidants may be used.

Such a compound may be extruded as a tube to enclose the conductor or otherwise applied to the cable like any ordinary rubber compound and may be cured in the same way.

The foregoing and other features of my invention will now be described in connection with the accompanying drawing forming part of this specification in which I have shown my cable in its preferred form after which I shall point out more particularly in the claims those features which I believe to be new and of my own invention.

In the drawing:

The single figure is a side view of my invention, in which I represents my conductor which may be either a solid wire or a plurality of strands and I may also use a plurality of separate conductors.

Over the conductor I I form a layer of my insulating material 2. Suitable mechanical protection 3 may then be used outside of the insulation 2, which may be either metallic or non-metallic, as customary in the art.

The novel feature of this invention lies in the compound used to form the insulating material 2. This compound may be varied to suit the different conditions of service required of the cable, but in all instances it comprises a plastic susceptible of conversion to elastic form by the use of a conversion agent such as sulfur or zinc oxide and a saturated macro-molecular hydrocarbon of mineral oil origin.

I may use rubber alone or in combination with, or instead of rubber, "Neoprene", "Thiokol", or "AXF" plastic, all of which is commercially available.

Macro-molecular is used throughout the specification and claims to mean a molecular weight of the order of tens of thousands. Such a material is commercially available in the forms known as "Vistanex" which is produced by polymerization processes applied to olefins generated in cracking operations, thereby bringing the molecular weights to more than 20,000.

A typical compound has the following composition:

| | |
|---|---|
| Rubber | 25 |
| Macromolecular hydrocarbon of the type known as Vistanex | 15 |
| Agerite resin-D | 1 |
| Zinc oxide | 55.5 |
| Carbon black | 1 |
| Stearic acid | 0.9 |
| Thionex | 1.5 |
| Sulfur | .1 |
| | 100.0 |

Other compounds are made with gilsonite and/or factice or vulcanized oil according to procedures known to the art and according to the properties desired in the uncured or cured condition.

Gilsonite decreases the water absorption. Factice is mixed with rubber where ozone-resistance is desired. The addition of macromolecular hydrocarbons derived from mineral oil, has the effect of giving factice-rubber compounds greater independence of pliability with temperature, better oxygen, ozone, acid, alkali and water resistance and improved ageing characteristics.

Thiokol is marketed by the Thiokol Corporation and well known to the trade as a reaction product of halogen additive compounds of olefins with polysulfides and for convenience of description may be described as an olefine polysulfide reaction product.

AXF is a well known plastic and is a reaction product of halogen additive compound of olefine with an aromatic (ring type) hydrocarbon. AXF is the trade name used by the Naugatuck Chemical Company to designate the product which they make by reacting ethylene chloride with benzene in the presence of suitable catalysts.

Vistanex is a well known Standard Oil Company of New Jersey product and is a hydrocarbon of high molecular weight formed by polymerizing unsaturated hydrocarbons such as isobutylene.

Agerite resin D is the trade name used by R. T. Vanderbilt Company for their antioxidant and is polymerized trimethyldihydroquinoline.

Thionex is the trade name used by Du Pont de Nemours for their accelerator of vulcanization and is a tetra methyl thiuram mono sulphide.

Santo Resin is the trade name used by Monsanto Chemical Company to designate a hydrocarbon which is highly unsaturated. It is not a pure substance but a mixture of several members of the same group of hydrocarbons.

Gilsonite is a naturally occurring hydrocarbon mixture defined by Abraham in his book Asphalt and allied substances, 1918, page 127, as an asphallite.

Neoprene is the trade name applied to a group of materials made by E. I. Du Pont Company. There are polymers of beta-chloro-butadiene and contain small percentages of stabilizing agents; they are solids and are capable of being plasticized to a degree where they may be processed on standard rubber handling machinery. They can be converted into non-thermoplastic materials by the use of suitable agents.

I wish it distinctly understood that my electric cable herein described is in the form I desire to use it and that changes or variations may be made as may be convenient or desirable without departing from the salient features of my invention and I therefore intend the following claims to cover such modifications as naturally fall within the lines of invention.

I claim:

1. An insulation for an electric cable having a high heat resistance and unusually high resistance to water absorption as determined by deterioration of electrical properties when immersed in hot potable water or steam, comprising a vulcanized resilient insulating compound which is the product of vulcanizing a mixture consisting essentially of by weight, 25 parts of mechanically plasticized rubber, 15 parts of polyisobutylene, 55.5 parts of zinc oxide in the form of a fine powder, one part of polymerized trimethyl dihydroquinoline, one part of carbon black, 0.9 parts of stearic acid, 1.5 parts of tetra methyl thiuram mono sulfide, 0.1 parts sulfur milled and formed prior to vulcanization.

2. An insulation for an electrical cable having high heat resistance and unusually high resistance to water absorption as determined by deterioration of electrical properties valuable for insulating purposes, when immersed in hot potable water or steam, comprising a vulcanized resilient insulating compound which is the product of vulcanizing a mixture consisting essentially of, by weight 20 to 30 parts mechanically plasticized rubber, 10 to 20 parts of polyisobutylene, 50 to 60 parts of zinc oxide in the form of fine powder under 5 parts of polymerized trimethyl dihydroquinoline, under 2 parts of carbon black, under one part of stearic acid, under 2 parts of tetra methyl thiuram monosulfide, under one part sulphur, all to be milled and formed around the cable prior to vulcanization.

WALLACE BENTLEY MacKENZIE.